(12) United States Patent
Fuchs

(10) Patent No.: US 7,405,911 B2
(45) Date of Patent: Jul. 29, 2008

(54) CIRCUIT ARRANGEMENT WITH A VOLTAGE LINK CONVERTER

(75) Inventor: Andreas Fuchs, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 490 days.

(21) Appl. No.: 10/518,902

(22) PCT Filed: Jun. 16, 2003

(86) PCT No.: PCT/DE03/02016

§ 371 (c)(1),
(2), (4) Date: Dec. 23, 2004

(87) PCT Pub. No.: WO2004/004108

PCT Pub. Date: Jan. 8, 2004

(65) Prior Publication Data

US 2005/0225918 A1   Oct. 13, 2005

(30) Foreign Application Priority Data

Jun. 27, 2002   (DE) ................ 102 28 825

(51) Int. Cl.
*H02H 7/00* (2006.01)
*H02H 9/00* (2006.01)
(52) U.S. Cl. .................................................. 361/18
(58) Field of Classification Search .............. 361/18
See application file for complete search history.

(56) References Cited

U.S. PATENT DOCUMENTS

| 4,005,350 | A | | 1/1977 | Brenneisen | |
|---|---|---|---|---|---|
| 5,371,647 | A | * | 12/1994 | Fried et al. | 361/119 |
| 5,574,636 | A | * | 11/1996 | Lee et al. | 363/132 |
| 5,946,178 | A | * | 8/1999 | Bijlenga | 361/91.5 |
| 6,188,557 | B1 | * | 2/2001 | Chaudhry | 361/111 |

FOREIGN PATENT DOCUMENTS

| DE | 23 49 161 A1 | 4/1975 |
|---|---|---|
| DE | 29 06 556 C2 | 8/1980 |
| DE | 198 33 490 A1 | 1/2000 |
| WO | WO 01/71900 A2 | 9/2001 |

\* cited by examiner

*Primary Examiner*—Ronald W Leja
(74) *Attorney, Agent, or Firm*—Harness, Dickey & Pierce, P.L.C.

(57) ABSTRACT

A circuit arrangement with a voltage link converter includes a link capacitor and circuit branches arranged parallel thereto. The circuit branches each include circuit elements, connected in series. A short circuit thyristor is provided to protect against short circuit currents. A short circuit protection arrangement is provided for connection to the link circuit capacitor and the circuit branches. The above includes a parallel connection of the short circuit thyristors with opposed conducting pairs of protective diodes connected in series. The short circuit protection arrangement is connected parallel to the link circuit capacitor and each connection point between two circuit elements of a circuit branch which are connected in series, is connected to a connection point between two protection diodes of the short circuit protection arrangement which are connected in series.

7 Claims, 2 Drawing Sheets

CIRCUIT ARRANGEMENT WITH A VOLTAGE LINK CONVERTER

This application is the national phase under 35 U.S.C. § 371 of PCT International Application No. PCT/DE2003/02016 which has an International filing date of Jun. 16, 2003, which designated the United States of America and which claims priority on German Patent Application number DE 102 28 825.9 filed Jun. 27, 2002, the entire contents of which are hereby incorporated herein by reference.

FIELD OF THE INVENTION

The invention generally relates to a circuit arrangement having a voltage link converter. Preferably, the converter contains an intermediate-circuit capacitor and switching paths, which are arranged parallel therewith and have series-connected switching elements, a short-circuit thyristor being provided as protection against short-circuit currents and overvoltages.

These switching elements may be components which can be switched off, such as thyristors, in particular GTO thyristors with freewheeling diodes connected back-to-back in parallel.

BACKGROUND OF THE INVENTION

A circuit arrangement is disclosed in the offprint from ZEV-DET Glasers Annalen, Issue 2/3 1994: Rudolf Wagner "Drehstrom-Antriebstechnik für Diesellokomotiven in Nordamerika" [Three-phase drive technology for diesel locomotives in North America]. The three-phase drive technology described therein requires the use of a voltage link converter between the voltage supply and the three-phase motor. During braking, the traction motors become generators, such that current is fed back to the voltage link converter. In this case, it would be possible for GTO thyristors provided in the converter to be damaged by overcurrents and overvoltages.

It is known from the work mentioned, to use a hardware protection system for the purpose of preventing such damage. In the same work it is also proposed to use a simple short-circuit thyristor for the purpose of reducing an overvoltage, since this does not require much space and is also more cost-effective than a protection system.

The protection systems described can only be used if the converter has GTO thyristors, since in this case the current-carrying capacity is high.

SUMMARY OF THE INVENTION

An embodiment of the invention is based on an object of specifying a circuit arrangement having a voltage link converter which reduces the surge-current load on the freewheeling diodes in the switching paths when the protection is used and thus makes it possible also to use freewheeling diodes having a lower surge current-carrying capacity than previously, as is the case, for example, with the freewheeling diodes of bonded IGBT modules. In particular, it should be possible to use the circuit arrangement even when the converter contains IGBTs and their freewheeling diodes as the switching elements.

An object may be achieved according to an embodiment of the invention by a short-circuit protection arrangement, including a parallel circuit of the short-circuit thyristor with pairs of series-connected protective diodes which conduct in opposition to said short-circuit thyristor, being connected to the intermediate-circuit capacitor and to the switching paths, by the short-circuit protection arrangement being connected in parallel with the intermediate-circuit capacitor, and by in each case a connection point between two series-connected switching elements in a switching path being connected to in each case a connection point between two series-connected protective diodes of the short-circuit protection arrangement.

The protective diodes, which are novel in the circuit arrangement according to an embodiment of the invention, do not carry a current during normal operation of the converter. Neither do they contribute to the commutation processes of the converter. They can therefore advantageously be optimized to low forward voltages and thus to high permitted current surges, which may occur when a short-circuiter thyristor is triggered. In this case, it is irrelevant if the protective diodes have switching properties which are not as good. The good switching properties of the converter are ensured by the freewheeling diodes of the switching elements in the switching paths.

In particular, an embodiment of the invention achieves the advantage that the good switching properties are ensured by the freewheeling diodes in the switching paths, whereas the good conducting properties are ensured by the protective diodes of the short-circuit protection arrangement. An advantageous combination results.

In the event of a fault, i.e. in the event of a short circuit, the short-circuit thyristor is triggered, with the result that the intermediate-circuit capacitor is discharged. Once the intermediate-circuit capacitor has been discharged, in each case an associated pair of protective diodes and a pair of freewheeling diodes of the switching elements in one switching path are connected in parallel. As a result, the freewheeling diodes in the switching paths are relieved of short-circuit currents brought about on the load side or on the power supply system side, by the protective diodes.

An embodiment of the invention achieves the advantage that in particular the switching paths and the switching elements provided there are protected against overcurrents and overvoltages.

For example, the short-circuit protection arrangement is only connected to the intermediate-circuit capacitor and to the switching paths of the power supply system side. According to another example, the short-circuit protection arrangement is only connected to the intermediate-circuit capacitor and to the switching paths of the load side. With these alternatives, the advantage is achieved that, if required, only the particularly affected parts of the converter can also be protected against short circuits.

The switching elements in the switching paths are, for example, IGBTs (insulated gate bipolar transistors). It has not always been possible to date to protect such transistors against short circuits even in conjunction with a known protection method, since they can withstand overvoltages and overcurrents to a lesser extent than GTOs. The circuit arrangement according to an embodiment of the invention achieves the advantage that even more sensitive IGBTs and their freewheeling diodes can be reliably protected against short circuits.

For example, the short-circuit protection arrangement is connected to the intermediate-circuit capacitor via additional protective diodes arranged in two connecting lines, the additional protective diode in the first connecting line conducting in opposition to the additional protective diode in the second connecting line. This further improves protection against short-circuit currents, since they can be rectified as regards the conducting direction of the short-circuit thyristor.

For example, the short-circuit thyristor may have associated current-limiting components. These may be a resistor, an inductance, a transformer or a combination of these components. Such additional components are suitable for further limiting the current flow.

With the circuit arrangement according to an embodiment of the invention, short-circuit currents are reliably kept away from a converter using simple means, such that even IGBTs can be used in the converter.

BRIEF DESCRIPTION OF THE DRAWINGS

One exemplary embodiment of the circuit arrangement according to the invention is explained in more detail with reference to the drawing, in which.

DETAILED DESCRIPTION OF THE EXEMPLARY EMBODIMENTS

Figure 1:
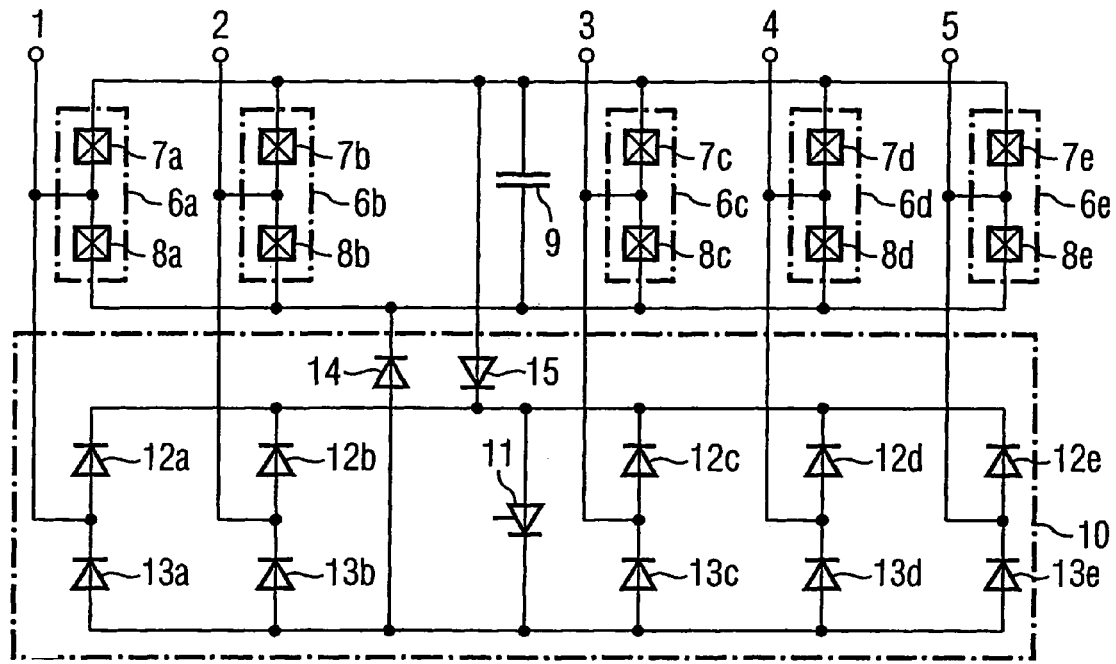
FIG. 1 shows a circuit arrangement having a voltage link converter and a short-circuit protection arrangement.

As shown in FIG. 1, a conventional voltage link converter has connections 1 and 2 for a voltage supply and connections 3 to 5 for a three-phase motor. The connections 1 to 5 mentioned are each connected to switching paths 6a to 6e and there to connection points between series-connected switching elements 7a to 7e, on the one hand, and 8a to 8e, on the other hand. In this case, a series circuit including two switching elements (for example 7a and 8a) forms a switching path (for example 6a). The switching paths 6a to 6e are connected in parallel with one another and to an intermediate-circuit capacitor 9.

A short-circuit protection arrangement 10 is connected to the intermediate-circuit capacitor 9 and to the switching paths 6a to 6e. The short-circuit protection arrangement 10 includes a parallel circuit of a short-circuit thyristor 11 with pairs of series-connected protective diodes 12a to 12e and 13a to 13e which conduct in opposition to said short-circuit thyristor 11. Apart from the fact that the short-circuit protection arrangement 10 is connected in parallel with the intermediate-circuit capacitor 9, in each case a connection point between two series-connected switching elements 7a to 7e and 8a to 8e in a switching path 6a to 6e is connected to in each case a connection point between two series-connected protective diodes 12a to 12e and 13a to 13e of the short-circuit protection arrangement 10.

An additional protective diode 14, 15 is arranged in each of the two connecting lines, which produce the parallel circuit of the short-circuit thyristor 11 with the intermediate-circuit capacitor 9. These protective diodes 14, 15 conduct in opposition to one another.

Figure 2:
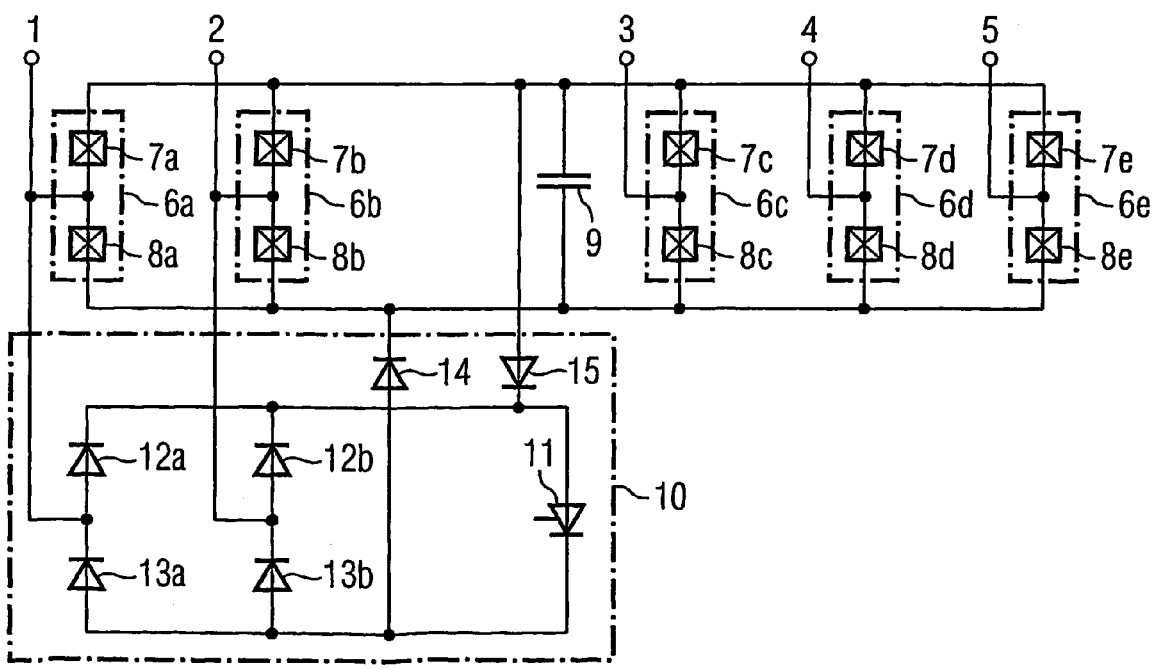
FIG. 2 shows a circuit arrangement in which only the power supply system side of the converter is protected.
Figure 3:
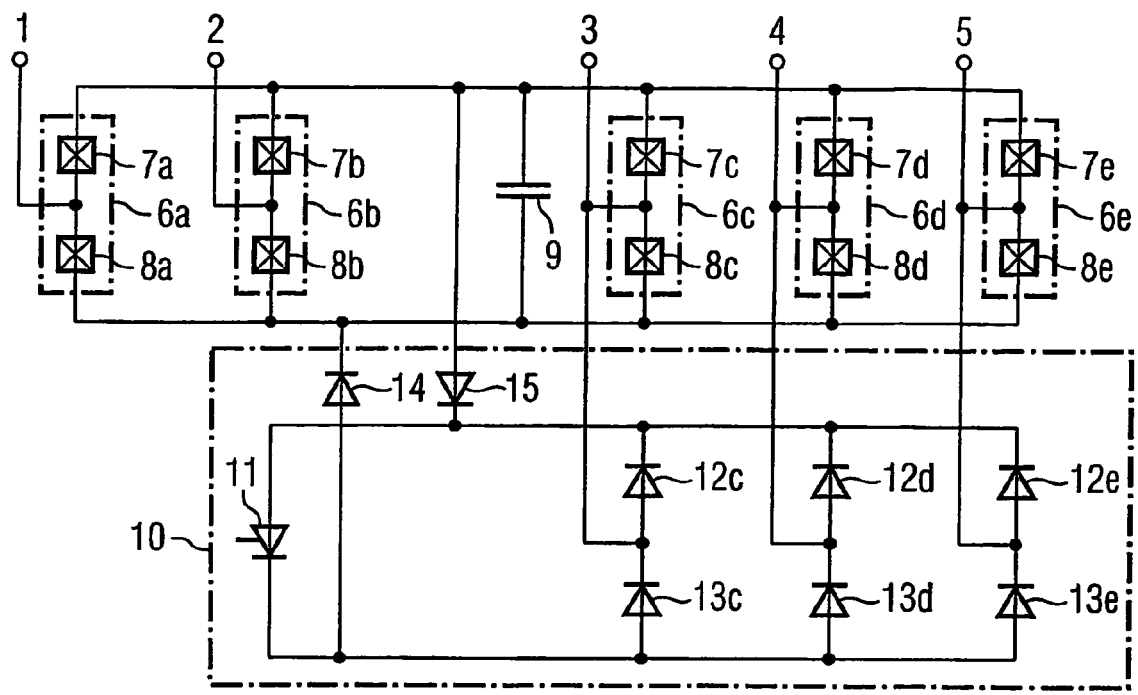
FIG. 3 shows a circuit arrangement in which only the load side of the converter is protected.

In FIGS. 1 to 3, the same reference numerals correspond to the same components. The two embodiments in FIGS. 2 and 3 differ from the embodiment shown in FIG. 1 only in that, according to FIG. 2, the short-circuit protection apparatus 10 only has the intermediate-circuit capacitor 9 and the switching paths 6a and 6b of the power supply system side associated with it, whereas, according to FIG. 3, the short-circuit protection arrangement 10 only has the intermediate-circuit capacitor 9 and the switching paths 6c to 6e of the load side associated with it.

Figure 4:
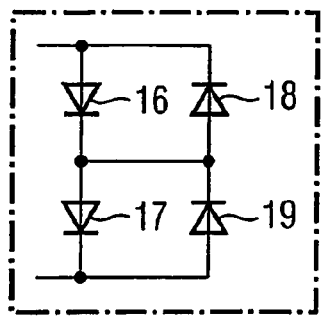
FIGS. 4 and 5 show variants of the series-connected pairs of switching elements provided in the switching paths.
Figure 5:
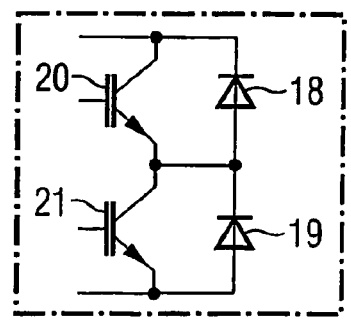

FIGS. 4 and 5 show two examples illustrating how a switching path 6 can be designed to have two switching elements 7, 8. FIG. 4 shows two GTO thyristors 16, 17 with their freewheeling diodes 18, 19 connected back-to-back in parallel and in each case connected in series.

FIG. 5 shows a similar circuit arrangement to that shown in FIG. 4. In this case, however, IGBT transistors 20, 21 are provided instead of the GTO thyristors 16, 17 from FIG. 4.

Figure 6:
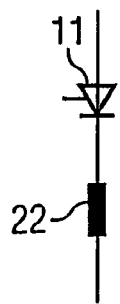
FIGS. 6 to 9 show variants of current-limiting components in conjunction with the short-circuit thyristor.
Figure 7:
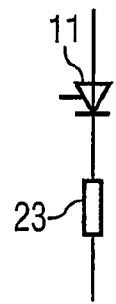
Figure 8:
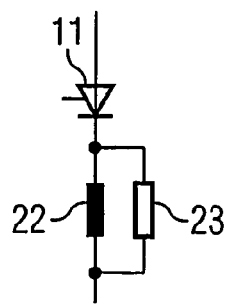
Figure 9:
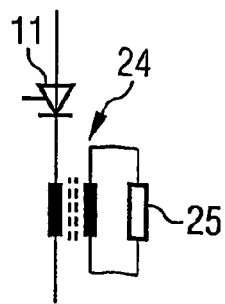

FIGS. 6 to 9 show the short-circuit thyristor 11 in conjunction with associated current-limiting components. As shown in FIG. 6, an inductance 22 is connected in series. As shown in FIG. 7, a resistor 23 is connected in series. As shown in FIG. 8, a parallel circuit comprising an inductance 22 and a resistor 23 is connected in series. As shown in FIG. 9, the primary winding of a transformer 24 is connected in series, the connections of the secondary winding of the transformer 24 being connected to a resistor 25.

With the circuit arrangement according to an embodiment of the invention it is possible to reliably control, using simple means, overvoltages and overcurrents in the converter brought about by short circuits. It is even possible to use sensitive IGBTs and their freewheeling diodes in the switching paths 6a to 6e.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A circuit arrangement, comprising:
a voltage link converter, including an intermediate-circuit capacitor and switching paths, arranged in parallel therewith and including series-connected switching elements, wherein a short-circuit thyristor is provided as protection against short-circuit currents and overvoltages; and
a short-circuit protection arrangement, including a parallel circuit of the short-circuit thyristor with pairs of series-connected protective diodes which conduct in opposition to said short-circuit thyristor, connected to the intermediate-circuit capacitor and to the switching paths, wherein the short-circuit protection arrangement is connected in parallel with the intermediate-circuit capacitor and the short-circuit protection arrangement is connected to the intermediate-circuit capacitor via additional protective diodes arranged in two connecting lines, the additional protective diode in the first connecting line conducting in opposition to the additional protective diode in the second connecting line, wherein a connection point between two series-connected switching elements in a switching path is connected to a connection point between two series-connected protective diodes of the short-circuit protection arrangement, and wherein the switching elements in the switching paths are IGBTs.

2. The circuit arrangement as claimed in claim 1, wherein the short-circuit protection arrangement is only connected to the intermediate-circuit capacitor and to the switching paths of the power supply system side.

3. The circuit arrangement as claimed in claim 2, wherein the short-circuit thyristor has associated current-limiting components.

4. The circuit arrangement as claimed in claim 1, wherein the short-circuit protection arrangement is only connected to the intermediate-circuit capacitor and to the switching paths of the load side.

5. The circuit arrangement as claimed in claim 4, wherein the short-circuit thyristor has associated current-limiting components.

6. The circuit arrangement as claimed in claim 1, wherein the short-circuit thyristor has associated current-limiting components.

7. The circuit arrangement as claimed in claim 1, wherein the series connected protective diodes do not carry a current during normal operation of the voltage link converter.

* * * * *